3,446,573
PROCESS FOR PURIFYING AIR

Edmund Richter, Kassel-Bettenhausen, Germany, assignor to Spinnfaser Aktiengesellschaft, Kassel-Bettenhausen, Germany
No Drawing. Filed Jan. 15, 1965, Ser. No. 425,919
Claims priority, application Germany, Feb. 11, 1964, S 89,460
Int. Cl. B01d 53/34
U.S. Cl. 23—4      4 Claims

ABSTRACT OF THE DISCLOSURE

Scrubbing air contaminated wtih $H_2S$ in aqueous, alkaline $Fe(OH)_3$ suspension at a flow speed of at least 30 centimeters per second in a gas scrubber containing an alkaline, aqueous, 2–5% by weight ferric hydroxide suspension having an alkalinity equivalent to more than 0.2% sodium carbonate, with a gas residence time in said scrubber of at least five seconds, the ferric hydroxide being present in said scrubber in an amount sufficient to make available for reaction with the hydrogen sulfide at least 7.5 moles of ferric hydroxide per mol of hydrogen sulfide in said scrubber, thereby forming in said suspension elemental sulfur, and increasing load limit of hydrogen sulfide in air scrubbed by suspension by providing cobalt and/or nickel hydroxide therein.

---

This invention relates to improvements in processes for purifying air by removal of hydrogen sulfide.

The purification of hydrogen sulfide-containing air by passing the latter through an aqueous, alkaline, ferric hydroxide suspension is the subject of Berndt and Wendlandt U.S. Patent No. 2,899,267. This invention pertains to improvements in this type of air purification process by providing in alkaline, ferric hydroxide suspension small quantities of hydroxides of cobalt and/or nickel.

The Berndt et al. process, briefly, is a process in which the air to be purified is passed through an alkaline iron hydroxide suspension at a flow speed of at least 30 centimeters per second. The alkaline iron hydroxide suspension must be present in sufficient amount to provide at least 7.5 moles of ferric hydroxide per mole of hydrogen sulfide, preferably at least 20 moles of ferric hydroxide per mole of hydrogen sulfide.

The hydrogen sulfide is converted to iron sulfide and the iron sulfide oxidized to produce sulfur in a single process step in which the following two reactions occur:

$$4Fe(OH)_3 + 6H_2S \rightarrow 2Fe_2S_3 + 12H_2O$$
$$2Fe_2S_3 + 3O_2 + 6H_2O \rightarrow 4Fe(OH)_3 + 3S_2$$

Although the above two reactions differ considerably in their reaction speeds, they must be effected simultaneously in the reaction vessel in order that the hydrogen sulfide be completely converted to sulfur.

The primary objective of this invention is to provide improvements in the aforesaid Berndt et al. process.

Another object of this invention is to provide a process for removing hydrogen sulfide from gases which is operable on gases containing a small amount of hydrogen sulfide and a relatively large amount of oxygen.

Another object of the invention is to provide a process for removing hydrogen sulfide from air in which process the hydrogen sulfide is adsorbed and converted to sulfur in a single process step.

A further object of the invention is to provide a process for removing hydrogen sulfide from effluent air obtained from viscose plants, which process does not require the use of frothing agents or other substances detrimental to later processing operations.

Another object of the invention is to provide a process for removing hydrogen sulfide from effluent air obtained from viscose plants, which process will not be detrimental to later processing of the air to remove carbon disulfide.

An important improvement of this invention in the Berndt et al. process is the increase in limit load of the ferric hydroxide suspension by providing therein small amounts of hydroxides of cobalt and/or nickel. The limit load is the maximum hydrogen sulfide content in the exhaust air which must not be exceeded in a given air scrubbing system. The limit load can be determined experimentally for any given scrubbing system as the concentration of hydrogen sulfide in the air being scrubbed, at which the scrubbing effect of the scrubbing suspension begins to diminish sharply.

It has been noted, for example, that scrubbing systems utilizing the aqueous, alkaline ferric hydroxide suspensions of the Berndt et al. patent diminish considerably in effectiveness of hydrogen sulfide removal when the load limit for the particular scrubbing system is exceeded. This further leads to undesirable side reactions in the alkaline, ferric hydroxide suspension, which side reactions consume alkali.

Berndt et al. set forth a lower limit of ferric hydroxide present in the scrubber as an amount sufficient to make available for reaction with hydrogen sulfide at least 7.5 moles, and preferably at least 20 moles, of ferric hydroxide per mole of hydrogen sulfide in the scrubber. The mole ratio of ferric hydroxide to hydrogen sulfide can be lower for an equivalent limit load in the suspensions of this invention before the hydrogen sulfide limit load is exceeded than is the case for a comparable scrubbing system using the aqueous, alkaline, ferric hydroxide suspension of the Berndt et al. process. Alternatively, at the same ferric hydroxide to hydrogen sulfide ratio in comparable scrubbing systems, the limit load of the scrubbing suspensions of this invention is greater than that of the aqueous, alkaline, ferric hydroxide suspension of Berndt et al. Still further, the scrubbing suspensions of this invention in scrubbing systems operated well below the limit load can be advantageous solely in savings in alkali consumption, e.g., amounts up to about 30%.

The necessary additive amounts are small. There suffices 0.1% to 0.5% of nickel and/or cobalt, calculated as metal and based on the iron in the ferric hydroxide of the suspension. Cobalt has the greater effect, but preferably there is used a mixture of nickel and cobalt hydroxides. The mixture ratio can be chosen at will. A ratio of about 10 parts of nickel to about 1 part of cobalt has proved especially successful.

The nickel and/or cobalt hydroxide addition is carried out most simply by adding dissolved nickel and/or cobalt salts to the alkaline ferric hydroxide suspension or executing a precipitation in common from a solution containing the iron salt, to which suspension or solution the calculated amounts of Ni- and/or Co-salt solution were previously added.

EXAMPLE

A scrubber of 3.5 meters diameter and 10 meters height was charged with 120 cubic meters per hour of ferric hydroxide suspension with 12 grams per liter of ferric hydroxide, 13 grams per liter of $Na_2CO_3$ and 10 grams per liter of $NaHCO_3$. The exhaust air throughout amounted to 25,000 cubic meters per hour. The limit load was found for this system at 1.8 grams $H_2S$ per cubic meter of exhaust air. Then there were added nickel and/or cobalt salts in the amounts of Ni and/or Co given in the table (expressed in weight percent of the Fe content of the suspension) to the ferric hydroxide suspension. The cobalt and/or nickel formed the hydroxides upon addition. The limit loads given in the third column were found:

| Experiment | Addition | Limit load (g. $H_2S/m.^3$) |
|---|---|---|
| A | None | 1.8 |
| B | 0.2% Ni | 2.2 |
| C | 0.18% Ni+0.02% Co | 2.5 |
| D | 0.2% Co | 3.0 |

The conditions in the gas scrubber for the practice of the invention are similar to the conditions described in the aforesaid Berndt and Wendlandt patent with minor variations as a result of the improvements provided by the addition to the ferric hydroxide suspension of hydroxides of nickel and/or cobalt.

The reaction vessel employed in the invention may be any conventional type of gas scrubber such as a packed tower or bubble-cap tower. In addition to the scrubber, means should preferably be provided for the recirculation of the suspension. The sulfur formed by the purification process is removed from the iron hydroxide suspension by flotation after which the recovered sulfur may be dried in a suction cell filter and then reprocessed.

The iron hydroxide concentration in the aqueous suspending solution should preferably be between 2 to 5% by weight as $Fe(OH)_3$. The alkalinity of the suspension is preferably adjusted to more than 0.2% $Na_2CO_3$. The temperature of the suspension should be at least 15° C., preferably 30–40° C.

The air to be purified is passed through the aforesaid suspension at a flow speed of at least 30 centimeters per second. The ferric hydroxide is present in the scrubber in an amount sufficient to provide at least 7.5 mols of ferric hydroxide per mol of hydrogen sulfide in the scrubber, or even slightly less, e.g., at least 5 or 6 mols of ferric hydroxide per mol of hydrogen sulfide. Preferably, however, the mol ratio of ferric hydroxide to hydrogen sulfide is at least about 20:1.

The maximum limit on the throughput speed of the effluent air in the reaction vessel is, of course, governed by the minimum residence time required. The residence time in turn is dependent on the concentration of hydrogen sulfide in the air. Generally, the $H_2S$ content of the effluent air resulting from viscose manufacture amounts to about 0.8 gram to about 1 gram $H_2S$ per cubic meter of air. In purifying air having such a concentration of $H_2S$, the residence time must not be less than 5 seconds, and where standard reaction vessels of 75 to 150 cubic meters capacity are employed, this residence time would be obtained with a throughput speed of about 170 centimeters per second. Accordingly, for such small concentrations of $H_2S$ it is preferable to employ a throughput speed of at least 150 centimeters per second. In certain viscose manufacturing operations the concentration of $H_2S$ and $CS_2$ will become larger, the former concentration being as much as 15 grams $H_2S$ per cubic meter. In this case the air can be purified employing a residence time of about 32 seconds and a throughput speed of about 30 centimeters per second when the same standard reaction vessel is employed. Care must be taken that the $CS_2/O_2$ ratio remain below an explosive proportion.

The process of the invention is effective in removing hydrogen sulfide contamination of air at both high and low hydrogen sulfide concentrations. The process produces no adverse side effects which would be detrimental to later processing of the air to remove entrained carbon disulfide or the like. Furthermore, the process is economical because sulfur losses due to side reactions are minimized, as is alkali consumption.

The invention is hereby claimed as follows:

1. In a process for purifying hydrogen sulfide-contaminated air by scrubbing said contaminated air with an aqueous, alkaline ferric hydroxide suspension at an air flow speed of at least 30 centimeters per second in a gas scrubber containing an alkaline, aqueous, 2–5% by weight ferric hydroxide suspension having an alkalinity equivalent to more than 0.2% sodium carbonate, with a gas residence time in said scrubber of at least five seconds, the ferric hydroxide being present in said scrubber in an amount sufficient to make available for reaction with the hydrogen sulfide at least 7.5 moles of ferric hydroxide per mol of hydrogen sulfide in said scrubber, thereby forming in said suspension elemental sulfur, the improvement which comprises employing in said process an aqueous, alkaline ferric hydroxide suspension containing a small amount, which amount is sufficient to increase the limit load of hydrogen sulfide in said air scrubbed by said suspension, of a hydroxide of a metal selected from the group consisting of cobalt, nickel, and both nickel and cobalt.

2. A process as claimed in claim 1, wherein said amount of said last mentioned hydroxide is 0.1% to 0.5% by weight, based on the iron of said ferric hydroxide suspension.

3. A process as claimed in claim 2, wherein said hydroxide is both nickel hydroxide and cobalt hydroxide at a weight ratio equivalent to about 10 parts nickel to about one part cobalt.

4. A process as claimed in claim 1, wherein the ferric hydroxide present in said scrubber is in an amount sufficient to make available for reaction with the hydrogen sulfide at least 20 moles of ferric hydroxide per mol of hydrogen sulfide in said scrubber.

References Cited

UNITED STATES PATENTS

| 1,841,419 | 1/1932 | Sperr | 23—2 X |
| 1,858,919 | 5/1932 | D'Leny et al. | 23—225 |
| 2,899,267 | 8/1959 | Berndt et al. | 23—4 |

OSCAR R. VERTIZ, *Primary Examiner.*

E. C. THOMAS, *Assistant Examiner.*

U.S. Cl. X.R.

23—2, 225